United States Patent
Umemoto et al.

(10) Patent No.: US 6,291,822 B1
(45) Date of Patent: Sep. 18, 2001

(54) SCANNING PROBE MICROSCOPE

(75) Inventors: Takeshi Umemoto; Yukihiro Sato; Masatoshi Yasutake, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/131,456

(22) Filed: Aug. 10, 1998

(30) Foreign Application Priority Data

Aug. 11, 1997 (JP) .................................................. 9-216322

(51) Int. Cl.[7] .................................................. G12B 21/22
(52) U.S. Cl. ..................... 250/306; 250/442.11; 73/105
(58) Field of Search .............................. 250/306, 442.11; 73/105

(56) References Cited

U.S. PATENT DOCUMENTS

| | | | |
|---|---|---|---|
| 4,017,694 | * | 4/1977 | King ............................ 179/115.5 VC |
| 4,343,993 | * | 8/1982 | Bining et al. ........................ 250/306 |
| 4,894,537 | * | 1/1990 | Blackford et al. .................... 250/306 |
| 4,906,840 | * | 3/1990 | Zdeblick et al. ..................... 250/306 |
| 5,808,302 | * | 9/1998 | Bining et al. ........................ 250/306 |

* cited by examiner

*Primary Examiner*—Jack Berman
(74) *Attorney, Agent, or Firm*—Adams & Wilks

(57) ABSTRACT

A scanning probe microscope comprises a cantilever having a probe at an end portion thereof. A scanning signal generating device generates a main scanning signal and a sub-scanning signal. A main scanning device scans the probe along a main scanning direction over a sample surface in accordance with the main scanning signal. A sub-scanning device scans the probe along a sub-scanning direction over the sample surface in accordance with the sub-scanning signal. A Z-direction fine moving device moves the probe in a fine movement in the Z direction with respect to the sample surface maintains the probe at a predetermined distance from the sample surface. At least two of the main scanning device, the sub-scanning device, and the Z-direction fine moving device comprise voice coil motors. Each of the voice coil motors has a stator having a groove and a movable member extending into the groove for undergoing movement therein. A viscous fluid is disposed in the groove of the stator of each voice coil motor for attenuating Q of a resonant vibration thereof.

7 Claims, 3 Drawing Sheets

SCANNING PROBE MICROSCOPE

BACKGROUND OF THE INVENTION

The present invention is related to a scanning probe microscope, typically known as an atomic force microscope (AFM). More specifically, the present invention is related to a scanning probe microscope capable of rapidly attenuating resonant vibrations produced in a probe drive system.

In a scanning probe microscope such as AFM, a cantilever, on which tip portion a probe is mounted, is used as a probe in order to detect very fine tissue and very fine structures of a sample surface by utilizing mutual effects occurred between the sample surface and the probe. Since either attracting force or repulsive force is produced by such force reacted among atoms between the probe and the sample surface, the force is detected as distortion amounts of the cantilever while the probe is scanned on the sample surface in the X/Y directions along the main scanning direction and the sub-scanning direction. When a sample stage is moved in a fine mode along the Z-axis direction in such a manner that this distortion amount, namely the space between the sample surface and the probe becomes a constant, the very fine movement signal, or the detected distortion amount itself may express the shape of the sample surface.

As the scanning mechanism for scanning the probe along the main scanning direction and also the sub-scanning direction, and as the very fine moving mechanism for moving the probe along the Z direction, a mechanism combining a stepper motor and a differential screw, and a mechanism using a piezoelectric actuator such as PZT have been proposed. Various improvements in view of dimensions and cost are required for these proposed mechanisms. To this end, the present inventors have developed such a scanning probe microscope for scanning and moving the probe in a very fine mode while using a voice coil motor which has been applied in an acoustic sound speaker. This scanning probe microscope is disclosed in Japanese Unexamined Patent Application No. 8-25201 (1996).

In case that the voice coil motors are employed as the scanning means and the fine moving means, the supporting mechanism for supporting the probe is mechanically coupled via the coupling means to the movable members of the respective voice coil motors. At this time, if the frequencies of the main scanning operation and of the sub-scanning operation, and also the frequency of the Z-fine moving operation (hereinafter referred to as "drive frequencies" hereinafter) are made coincident with the natural (characteristic) frequency of the probe drive system involving the voice coil motors and the supporting mechanism, then the probe drive system is resonated when the probe is driven, so that the probe is largely vibrated, or oscillated. Accordingly, the natural frequency "f0" of the probe drive system is designed in such a manner that this natural frequency is not made coincident with the main scanning frequency "fx", the sub-scanning frequency "fy", and the Z-fine moving frequency "fz". Concretely speaking, it is desirable to design such that the natural frequency f0 of the probe drive system is 5 to 10 times higher than the drive frequencies.

However, as a result of experiments conducted by the present inventors, even when the drive frequencies of the probe are not made coincident with the natural frequency of the probe drive system, since vibrations occur which contain the higher frequency component than the original scanning frequency at the returning time during the main scanning operation and the sub-scanning operation, the probe drive system may be resonated and be greatly vibrated.

FIGS. 3A–3C comparatively show a relationship between the scanning signals entered into the voice coil motors and the actual scanning positions of the probe. More specifically, FIG. 3A indicates the main scanning signal (drive current IX) used to scan the probe along the main scanning direction, and FIG. 3B represents the actual position (ordinate) of the probe scanned in response to the main scanning signal Ix with respect to the main scanning direction.

The probe drive system is not resonated just after the scanning operation is commenced until the first returning operation, but the scanning position of the probe may correctly follow the main scanning signal Ix. However, when the returning operation of the probe is commenced, since the scanning direction is instantaneously changed, the vibrations containing a higher frequency component than the original scanning frequency may be produced. As a result, the resonant vibrations may occur in the drive system. Accordingly, after the probe is scanned from the returning position, the drive system is relatively largely vibrated, so that the scanning positions are brought into unstable conditions. Thereafter, the resonance is gradually attenuated and then the drive system will become stable. However, when the next returning operation is again carried out, the probe is again resonated in the similar manner, so that the scanning positions are brought into unstable conditions.

As previously explained, the resonance occurred in the probe drive system is not considered in the conventional scanning probe microscope, and this resonance is caused by the vibrations produced when the probe is scanned from the returning position. As a consequence, there are such problems that the probe cannot be scanned under stable condition, and therefore the microscopic images are observed under unclear conditions.

The present invention has been made to solve the above-described problems, and therefore, has an object to provide a scanning probe microscope capable of rapidly attenuating resonant vibrations occurred in a probe drive system during probe scanning operations.

SUMMARY OF THE INVENTION

To achieve the above-described object, according to the present invention, in a scanning probe microscope in which a probe is approached to a surface of a sample, and the probe is scanned in X/Y directions while moving the probe in a fine mode in a Z direction in such a manner that a space between the probe and the sample surface is kept to a predetermined value, at least one of drive means is constructed of a voice coil motor; the drive means drive a cantilever type scanning probe in which a probe is formed on a free end thereof along a main scanning direction, a sub-scanning direction, and a Z direction; and a viscous fluid capable of suppressing "Q" of resonant vibrations thereof to a small value is filled into a space between a stator and a movable member of this voice coil motor.

In accordance with the above-described structure, when the probe is scanned during the returning operations along the main scanning direction and the sub-scanning direction, vibrations containing higher frequency components than the original scanning frequency are produced to be transferred to the probe drive system. As a result, even when the drive system involving the voice coil motor is resonant-vibrated, this resonant vibration can be quickly attenuated.

DETAILED DESCRIPTION OF THE PREFERRED EMBODIMENT

Figure 1:
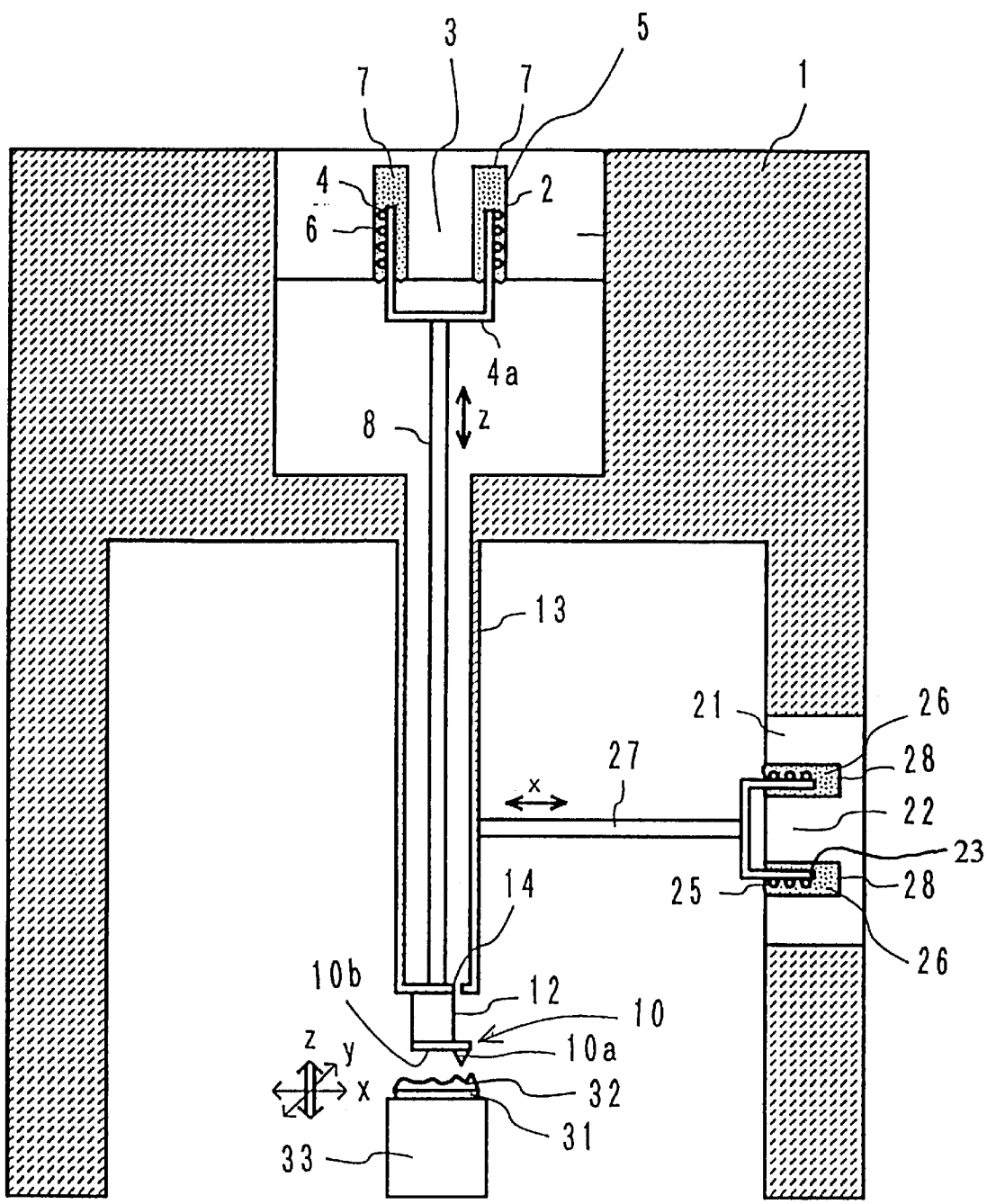
FIG. 1 is a structural diagram of a scanning probe microscope to which the present invention is applied.

Referring now to drawings, the present invention will be described in detail. FIG. 1 is a diagram for representing a structure of a major unit of a scanning probe microscope according to an embodiment of the present invention. A first permanent magnet 2 is mounted on an upper portion of a housing 1, and a center rod portion 3 surrounded by a annular-shaped groove 5 is formed in a center portion of the permanent magnet 2. A cap-shaped movable member 4 is loosely fitted to the center rod portion 3 of the permanent magnet 2, and a voice coil 6 is wound on an outer peripheral portion of the movable member 4. A viscous fluid (magnetic fluid) 7 containing a colloidal magnetic material is filled into the annular-shaped groove 5. Then, the permanent magnet 2, the center rod portion 3, the movable member 4, and the voice coil 6 may form a voice coil motor used in an acoustic speaker and the like.

One end of a spindle 8 extending along a Z direction is fixed on a center portion of a closed end 4a of the above-described movable member 4. A free end of a cantilever 14, the fixed end of which is supported by a center cylinder 13, is fixed on the other end of the spindle 8. A cantilever 10b of a probe 10 is fixed via a supporting base 12 on the cantilever 14, and a probe 10a is formed on a free end of the cantilever 10b.

A second permanent magnet 21 is mounted on a side surface of the above-described housing 1, and a center rod portion 22 surrounded by a annular-shaped groove 28 is formed in a center portion of the permanent magnet 2. A cap-shaped movable member 23 is loosely fitted to the center rod portion 22, and a voice coil 25 is wound on an outer peripheral portion of the movable member 23. A viscous fluid 26 is filled into the annular-shaped groove 28 in a similar manner. Then, the second permanent magnet 21, the center rod portion 22, the movable member 23, and the voice coil 25 may form a voice coil motor similar to the above-described voice coil motor. Although not shown in the drawing, openings are formed in the annular-shaped grooves 5 and 28, and the openings are communicated with a groove outer portion. In such a case that the viscous fluids 7 and 26 are filled into these grooves 5 and 28, air located inside the grooves is exhausted through these openings, so that the viscous fluids can be readily filled.

One end of a spindle 27 along an X direction is fixed on the movable member 23, and the other end of this spindle 27 is fixed on a side portion of the center cylinder 13. This voice coil motor may effect movement of the spindle 27 along the main scanning direction (namely, X direction). Since another voice coil motor (not shown in detail) having the same structure as the first-mentioned voice coil motor is provided at a position rotated by 90 degrees, this voice coil motor may effect movement of the spindle along the sub-scanning direction (Y direction). Then, since the voice coil motors along the main scanning direction and the sub-scanning direction are driven, the probe 10a is raster-scanned with respect to a surface of a sample. A sample base 31 is provided at a position opposite to the probe 10a, and a sample 32 to be observed is mounted on the sample base 31. This sample base 31 is mounted on a sample stage 33.

The viscous fluids filled into the respective voice coil motors may function as a damper capable of suppressing Q of characteristic frequencies of the respective movable members and the drive systems coupled to the respective movable members to a low value. As a result, when a viscous coefficient (viscous degree) of a viscous fluid to be filled is excessively increased, the damper function of this viscous fluid would be improved, but a response characteristic of a movable member would be lowered. Conversely, when the viscous coefficient is excessively decreased, the damper function would be lowered. As a consequence, it is preferable to set the viscous coefficient of the viscous fluid within a range between 500 and 1,500 centi-poise.

The viscous coefficients of the viscous fluids filled into the respective voice coil motors may be selected to be equal to each other within the above-described range. Alternatively, since the drive frequencies of the respective voice coil motors are different from each other, it is preferable to fill the viscous fluids having such viscous coefficients suitable to the respective drive frequencies.

For instance, when the frequency of the Z-fine-moving operation is sufficiently higher than the frequencies of the main scanning operation and the sub-scanning operation, and also the viscous coefficient of the viscous fluid filled into the Z-fine-moving voice coil motor is excessively increased, the response characteristic of the fine moving operation with respect to the fine moving signal would be lowered. As a consequence, the viscous coefficient of the viscous fluid which is filled into the Z-fine-moving voice coil motor is preferably selected lower than those of the main scanning voice coil motor and the sub-scanning voice coil motor. In view of a similar point, the viscous coefficient of the viscous fluid filled into the main scanning voice coil motor is preferably selected to be lower than that of the sub-scanning voice coil motor.

Figure 2:
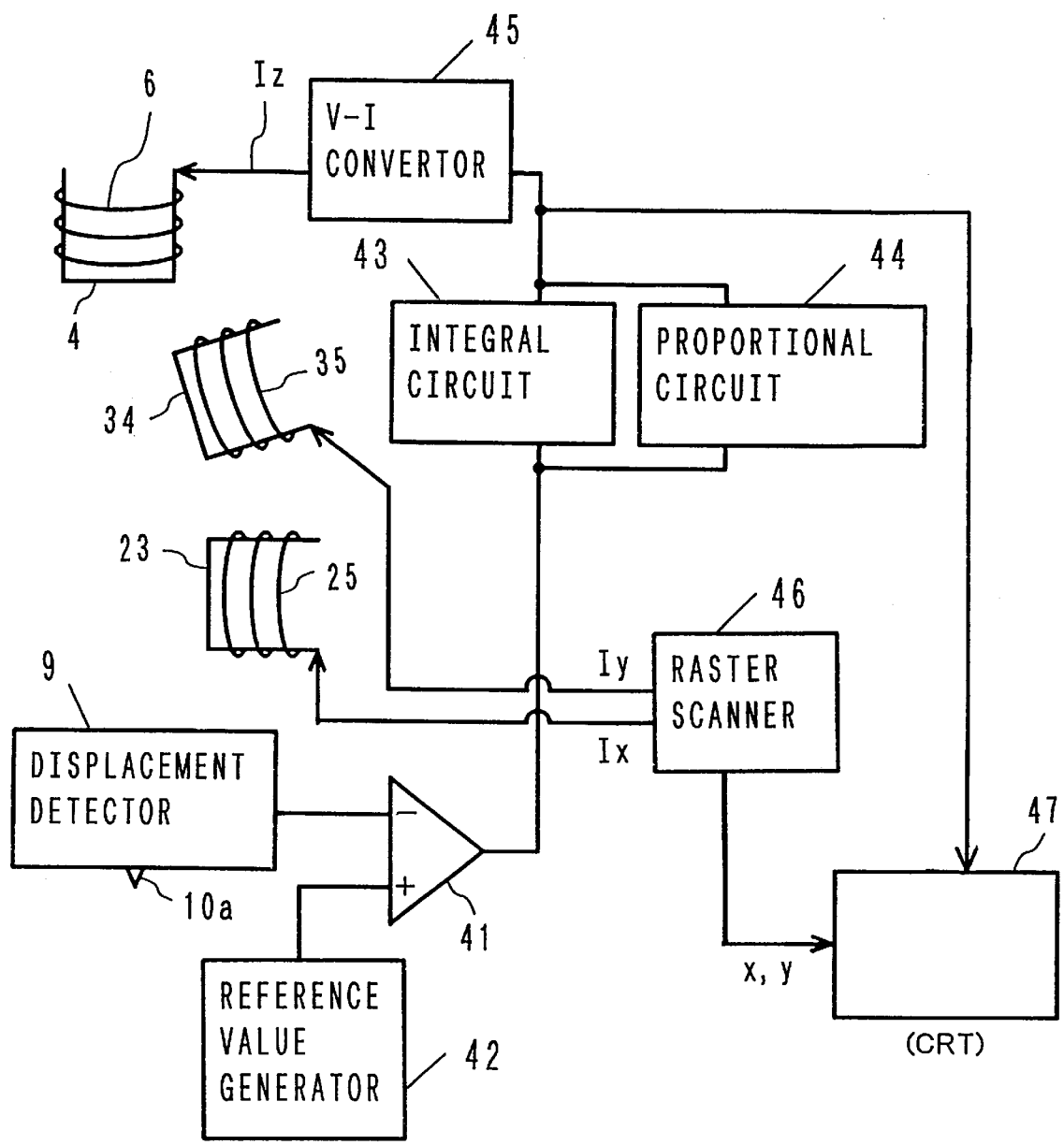
FIG. 2 is a block diagram of a drive circuit system of the scanning probe microscope to which the present invention is applied.

FIG. 2 is a block diagram showing a drive circuit system connected to the scanning probe microscope of FIG. 1. It should be noted that the same reference numerals shown in FIG. 1 represent the same, or similar components.

Upon displacement of the probe 10a, for example, a deflection amount of the probe 10 is detected by a displacement detector 9, and a detection signal derived from the displacement detector 9 is compared with a reference value outputted from a reference value generator 42 by a differential amplifier 41. Since this reference value is made equal to the detection value outputted from the displacement detector 9 when a distance between the probe 10a and the sample surface becomes a predetermined value, in such a case that the distance between the probe 10a and the sample surface is deviated from a predetermined value, the differential amplifier 41 outputs such a signal having an amplitude responding to the deviation amount.

A difference signal outputted from the differential amplifier 41 is processed by an integral circuit 43 and a proportional circuit 44, and then the processed difference signal is entered into a V/I converter 45. The V/I converter 45 converts the entered voltage signal into a current signal and supplies this current signal to a voice coil 6. In other words, the displacement detector 9, the differential amplifier 41, the integral circuit 43, the proportional circuit 44, and the V/I converter 45 constitute a feedback circuit.

On the other hand, a raster scanner 46 supplies a scanning signal current Ix of the main scanning direction and a scanning signal current Iy of the sub-scanning direction to the voice coil 25 wound on the X-direction movable member 23, and the voice coil 35 wound on the Y-direction movable member 34. The raster scanner 46 supplies an X-scanning signal and a Y-scanning signal to a CRT 47. The detection information such as shapes and physical amounts of the sample surface is derived from the input side of the V/I converter 45 to be supplied to the CRT 47.

In such an arrangement, since the distance between the probe 10a and the sample surface represents firstly a large value, a difference between the reference value outputted from the reference value generator 42 and the displacement detection value outputted from the displacement detector 9 is also a large value, and a high signal voltage is outputted from the differential amplifier 41. This signal voltage is processed by the integral circuit 43 and the proportional circuit 44, and then the processed signal voltage is converted by the V/I converter 45 into a current Iz. This current Iz is supplied to the voice coil 6 wound on the movable member 4.

Force capable of downwardly moving the movable member 4 is produced by the magnetic field of the permanent magnet 2 and the magnetic field generated by the current Iz flowing through the voice coil 6. As a result, the spindle 8 connected to the movable member 4 receives the downward force, and thus the cantilever 14 is deflected along the lower direction, so that the probe 10 is also moved along the lower direction. This movement is quickly performed since the large current Iz may flow through the voice coil 6.

As previously described, in the case that the probe 10a is approached to the surface of the sample 32 and the distance between the probe 10a and the surface of the sample 32 becomes a predetermined distance, since a displacement detection value derived from the displacement detector 9 becomes substantially equal to the reference value derived from the reference value generator 42, a signal voltage outputted form the differential amplifier 41 becomes substantially equal to 0, and further the current I flowing through the above-described voice coil 6 is similarly decreased.

When the coarse movement related to the Z direction is accomplished in the above-described manner, the main scanning operation, the sub-scanning operation, and the Z-fine moving operation are carried out at the same time. First, a main scanning mechanism and a sub-scanning mechanism, and also operations of these mechanisms will now be explained. It should be understood that both the scanning operation along the X direction and the scanning operation along the Y direction are carried out by the same, or similar mechanisms. The scanning mechanism along the X direction will now be explained in this case.

When the main scanning current Ix of the raster scanner 46 is supplied to the voice coil 25 wound on the movable member 23 which is loosely fitted to the center rod portion 22 of the permanent magnet 21 of FIG. 1, the spindle 27 connected to the movable member 23 along the X direction receives the force exerted along the X direction. Assuming now that the current Ix flows through the voice coil 25 along a negative direction, and thus the spindle 27 is pushed along a left direction, as viewed in FIG. 1, the center cylinder 13 is similarly deflected along the same direction. Conversely, assuming now that the current Ix flows through the voice coil 25 along a positive direction, and thus the spindle 27 is attracted along a right direction, as viewed in FIG. 1, the center cylinder 13 is similarly deflected along the same direction. As described above, when the center cylinder 13 is deflected from the −X direction to the +X direction, the probe 10a is scanned from the −X direction to the +X direction on the sample surface.

Next, a simple explanation will now be made of the Z-fine operation which is carried out between the main scanning operation and the sub-scanning operation. The feedback circuit (see FIG. 2) moves the movable member 4 by displacement of "z" along the upper/lower directions in order that the deflection amount of the probe 10 becomes constant in response to concaves/convexes of the surface of the sample 32. This displacement "z" is directly proportional to the current Iz flowing through the voice coil 6. The displacement "x" is equal to a displacement amount when the probe 10a is scanned to trace the surface of the sample 32, so that the concaves/convexes of the surface of the sample 32 are directly proportional to the above-described current Iz. In other words, while the current Iz flowing through the voice coil 6 is monitored, the concaves/convexes of the surface of the sample 32 can be monitored.

Figure 3A:
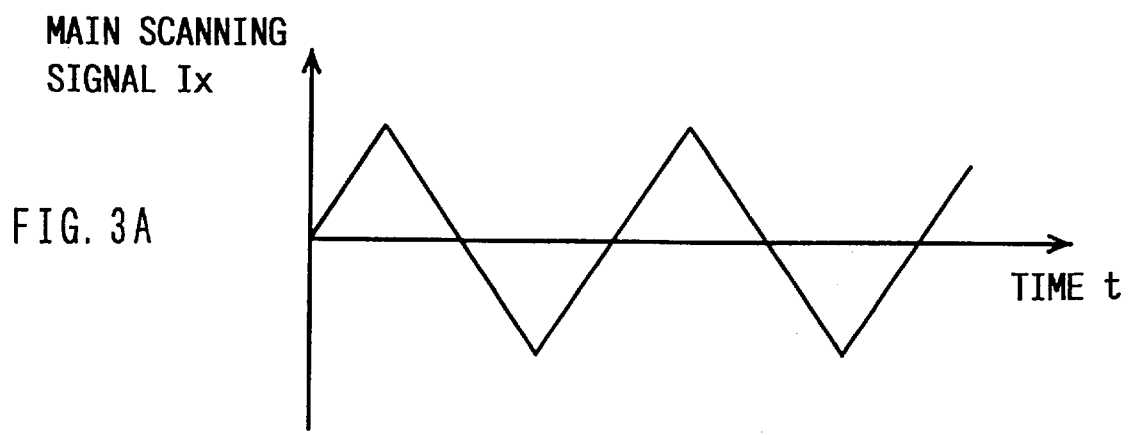
FIGS. 3A–3C are diagrams for representing a relationship between a scanning signal and an actual scanning position.
Figure 3B:
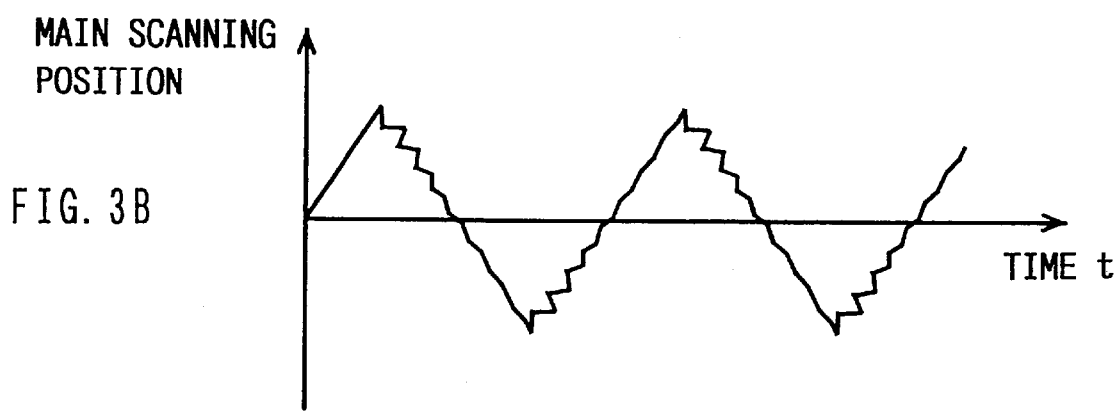
Figure 3C:
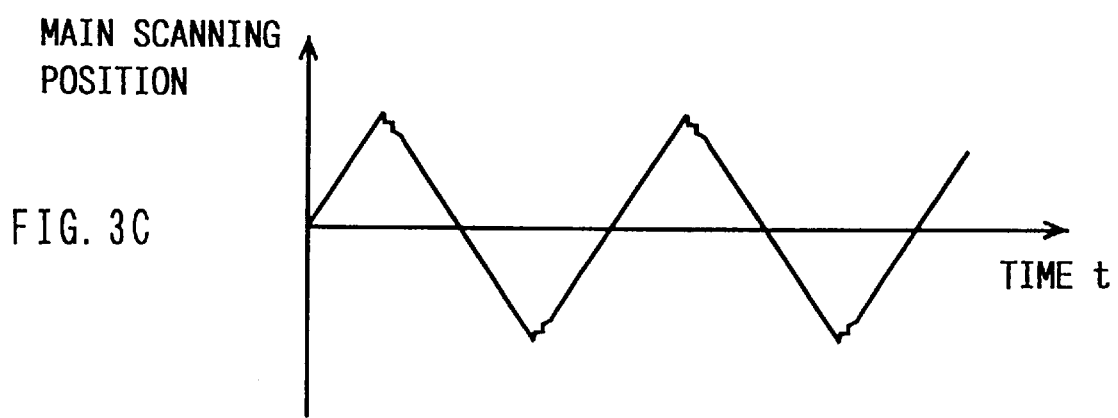

FIG. 3C indicates an actual position (ordinate) of the probe scanned in response to the main scanning signal IX shown in FIG. 3A as to the main scanning direction. As apparent from the comparison result between FIG. 3B and FIG. 3C, in accordance with this embodiment, although the scanning position becomes more or less unstable when the scanning operation is performed from the turning position since the drive system is resonated, "Q" of the resonant vibrations can be suppressed to a small value by the viscous fluid. As a result, the vibration amplitudes are apparently low. Moreover, since the resonant vibrations can be quickly attenuated, the adverse influence of the resonance appears only just after the returning position, and thereafter the stable scanning operation can be achieved.

It should also be noted that in the above-described embodiment, the magnetic fluid has been employed as the viscous fluid. The present invention is not limited to this magnetic fluid, but other viscous fluids such as silicone oil containing no magnetic material may be used.

In accordance with the present invention, the below-mentioned effects can be achieved:

(1) At least one of the main scanning means, the sub-scanning means, and the Z-direction fine moving means is constituted by the voice coil motor, and the viscous fluid for attenuating Q of the resonant vibration thereof to a small value is filled into the space defined between the stator of the voice coil motor and the movable member thereof. As a consequence, even when the resonant vibrations are produced in the probe drive system due to the vibrations having relatively high frequencies caused while the main and sub-scanning operations are performed from the return point, the resonant vibrations can be rapidly attenuated, and the disturbance in the observation images caused by the resonance of the probe can be suppressed to the minimum amount.

(2) If the viscous fluid filled into the main scanning voice coil motor, the viscous fluid filled into the sub-scanning voice coil motor, and the viscous fluid filled into the Z-direction voice coil motor have viscous coefficients different from each other, then Q of the resonant vibrations of the respective viscous fluids can be lowered without affecting the operation of each drive system.

(3) Since the opening communicated with the external portion is formed in the annular-shaped groove of the stator formed in such a manner that the viscous fluid is filled into this groove and the movable member is loosely fitted, air existing inside this groove is exhausted from this opening when the viscous fluid is filled into this groove. Accordingly, the viscous fluid can be easily filled into the groove.

What is claimed is:

1. A scanning probe microscope comprising: a cantilever having a probe at an end portion thereof; scanning signal generating means for generating a main scanning signal and a sub-scanning signal; main scanning means for scanning the probe along a main scanning direction over a sample surface in accordance with the main scanning signal; sub-scanning means for scanning the probe along a sub-scanning direction over the sample surface in accordance with the sub-scanning signal; and Z-direction fine moving means for moving the probe in a fine movement in the Z direction with respect to the sample surface and for maintaining the probe at a predetermined distance from the sample surface; each of the main scanning means, the sub-scanning means, and the z-direction fine moving means comprising a voice coil motor having a stator having a groove and a movable member extending into the groove for undergoing movement therein; and a viscous fluid disposed in the groove of the stator of each voice coil motor for attenuating Q of a resonant vibration thereof, the viscosity coefficients of the viscous fluids being different from one another.

2. A scanning probe microscope comprising: a cantilever having a probe at an end portion thereof; scanning signal generating means for generating a main scanning signal and a sub-scanning signal; main scanning means for scanning the probe along a main scanning direction over a sample surface in accordance with the main scanning signal; sub-scanning means for scanning the probe along a sub-scanning direction over the sample surface in accordance with the sub-scanning signal; and Z-direction fine moving means for moving the probe in a fine movement in the Z direction with respect to the sample surface and for maintaining the probe at a predetermined distance from the sample surface; each of the main scanning means, the sub-scanning means, and the z-direction fine moving means comprising a voice coil motor having a stator having a groove and a movable member extending into the groove for undergoing movement therein; and a viscous fluid disposed in the groove of the stator of each voice coil motor for attenuating Q of a resonant vibration thereof; wherein the viscosity coefficient of the viscous fluid disposed in the groove of the stator of the Z-direction voice coil motor is lower than those of the viscous fluids disposed in the grooves of the stators of the main scanning voice coil motor and the sub-scanning voice coil motor.

3. A scanning probe microscope comprising: a cantilever having a probe at an end portion thereof; scanning signal generating means for generating a main scanning signal and a sub-scanning signal; main scanning means for scanning the probe along a main scanning direction over a sample surface in accordance with the main scanning signal generated by the scanning signal generating means; sub-scanning means for scanning the probe along a sub-scanning direction over the sample surface in accordance with the sub-scanning signal generated by the scanning signal generating means; and Z-direction fine moving means for moving the probe in a fine movement in the Z direction with respect to the sample surface and for maintaining the probe at a predetermined distance from the sample surface; wherein at least two of the main scanning means, the sub-scanning means, and the z-direction fine moving means comprise voice coil motors each having a stator having a groove and a movable member extending into the groove for undergoing movement therein; and a viscous fluid disposed in the groove of the stator of each voice coil motor for attenuating Q of a resonant vibration thereof; wherein the at least two of the main scanning means, the sub-scanning means, and the z-direction fine moving means comprise the main scanning means and the sub-scanning means; and wherein the viscosity coefficient of the viscous fluid disposed in the groove of the stator of the main scanning voice coil motor is lower than that of the viscous fluid disposed in the groove of the stator of the sub-scanning voice coil motor.

4. A scanning probe microscope comprising: a cantilever having a probe at an end portion thereof; scanning signal generating means for generating a main scanning signal and a sub-scanning signal; main scanning means for scanning the probe along a main scanning direction over a sample surface in accordance with the main scanning signal generated by the scanning signal generating means; sub-scanning means for scanning the probe along a sub-scanning direction over the sample surface in accordance with the sub-scanning signal generated by the scanning signal generating means; and Z-direction fine moving means for moving the probe in a fine movement in the Z direction with respect to the sample surface and for maintaining the probe at a predetermined distance from the sample surface; wherein the main scanning means and the sub-scanning means comprise voice coil motors each having a stator having a groove and a movable member extending into the groove for undergoing movement therein; and a viscous fluid disposed in the groove of the stator of each voice coil motor for attenuating Q of a resonant vibration thereof; wherein the viscosity coefficient of the viscous fluid disposed in the groove of the stator of the main scanning voice coil motor is lower than that of the viscous fluid disposed in the groove of the stator of the sub-scanning voice coil motor.

5. A scanning probe microscope comprising: a cantilever having a probe at an end portion thereof; Z-direction moving means having a first voice coil motor and a first rod connecting the first voice coil motor to the cantilever for moving the probe in the Z direction with respect to a surface of a sample and for maintaining the probe at a predetermined distance from the sample surface; main scanning means having a second voice coil motor and a second rod connecting the second voice coil motor to the cantilever for scanning the probe along a main scanning direction over the sample surface; and sub-scanning means having a third voice coil motor and a third rod connecting the third voice coil motor to the cantilever for scanning the probe along a sub-scanning direction over the sample surface; wherein each of the first, second and third voice coil motors comprises a stator having a groove, a movable member connected to a respective one of the first, second and third rods and extending in the groove for movement therein in a respective one of the Z, main scanning and sub-scanning directions, and a voice coil wound around an outer peripheral portion of the movable member; and a viscous fluid disposed in the groove of the stator of each of the first, second and third voice coil motors for attenuating resonant vibrations generated during scanning of the probe in the main scanning and sub-scanning directions and during movement of the probe in the Z direction, the viscosity coefficients of the viscous fluids being different from one another.

6. A scanning probe microscope comprising: a cantilever having a probe at an end portion thereof; Z-direction moving means having a first voice coil motor and a first rod connecting the first voice coil motor to the cantilever for moving the probe in the Z direction with respect to a surface of a sample and for maintaining the probe at a predetermined distance from the sample surface; main scanning means having a second voice coil motor and a second rod connecting the second voice coil motor to the cantilever for scanning the probe along a main scanning direction over the sample surface; and sub-scanning means having a third voice coil motor and a third rod connecting the third voice coil motor to the cantilever for scanning the probe along a sub-scanning direction over the sample surface; wherein each of the first, second and third voice coil motors comprises a stator having a groove, a movable member connected to a respective one of the first, second and third rods and extending in the groove for movement therein in a respective one of the Z, main scanning and sub-scanning directions, and a voice coil wound around an outer peripheral portion of the movable member; and a viscous fluid disposed in the groove of the stator of each of the first, second and third voice coil motors for attenuating resonant vibrations generated during scanning of the probe in the main scanning and sub-scanning directions and during movement of the probe in the Z direction; and wherein the viscosity coefficient of the viscous fluid disposed in the groove of the stator of the Z-direction voice coil motor is lower than those of the viscous fluids disposed in the grooves of the stators of the main scanning and sub-scanning voice coil motors.

7. A scanning probe microscope comprising: a cantilever having a probe at an end portion thereof; Z-direction moving means having a first voice coil motor and a first rod connecting the first voice coil motor to the cantilever for moving the probe in the Z direction with respect to a surface of a sample and for maintaining the probe at a predetermined distance from the sample surface; main scanning means having a second voice coil motor and a second rod connecting the second voice coil motor to the cantilever for scanning the probe along a main scanning direction over the sample surface; and sub-scanning means having a third voice coil motor and a third rod connecting the third voice coil motor to the cantilever for scanning the probe along a sub-scanning direction over the sample surface; wherein each of the first, second and third voice coil motors comprises a stator having a groove, a movable member connected to a respective one of the first, second and third rods and extending in the groove for movement therein in a respective one of the Z, main scanning and sub-scanning directions, and a voice coil wound around an outer peripheral portion of the movable member; and a viscous fluid disposed in the groove of the stator of each of the first, second and third voice coil motors for attenuating resonant vibrations generated during scanning of the probe in the main scanning and sub-scanning directions and during movement of the probe in the Z direction; and wherein the viscosity coefficient of the viscous fluid disposed in the groove of the stator of the main scanning voice coil motor is lower than that of the viscous fluid disposed in the groove of the stator of the sub-scanning voice coil motor.

* * * * *